United States Patent [19]

Rubin

[11] Patent Number: 4,581,586

[45] Date of Patent: Apr. 8, 1986

[54] CROSSTALK REDUCTION IN UNBALANCED QPSK DETECTORS

[75] Inventor: Michael D. Rubin, Saratoga, Calif.

[73] Assignee: Ford Aerospace & Communications Corporation, Detroit, Mich.

[21] Appl. No.: 641,630

[22] Filed: Aug. 17, 1984

[51] Int. Cl.$^4$ .............................................. H03D 3/18
[52] U.S. Cl. ....................................... 329/50; 329/112; 329/145; 375/83; 375/99; 375/101; 455/295
[58] Field of Search ................. 329/50, 112, 122, 124, 329/145; 375/80, 81, 83, 99, 101, 102; 455/295

[56] References Cited

U.S. PATENT DOCUMENTS

| | | | |
|---|---|---|---|
| 4,085,378 | 4/1978 | Ryan et al. | 329/124 |
| 4,092,606 | 5/1978 | Ryan | 329/124 |
| 4,180,779 | 12/1979 | Hook et al. | 329/50 |
| 4,250,458 | 2/1981 | Richmond et al. | 329/112 |
| 4,359,692 | 11/1982 | Ryan | 329/50 |

*Primary Examiner*—Eugene R. LaRoche
*Assistant Examiner*—James C. Lee
*Attorney, Agent, or Firm*—Edward J. Radlo; Kenneth R. Allen; Robert D. Sanborn

[57] ABSTRACT

A method and apparatus for demodulating quadrature phase shift keyed (QPSK) signals in a manner which reduces crosstalk between channels. The in phase (I) data is recovered first by recovering the carrier frequency and then multiplying the carrier frequency by the QPSK signal. The I channel is contemplated to require higher power and thus the crosstalk error in the recovered I channel data is relatively small. The QPSK signal is then modulated with the recovered I channel data. The resulting signal is multiplied by a carrier in quadrature to the recovered carrier to produce a second signal in which the crosstalk component has been eliminated and which contains the quadrature (Q) channel data with the I channel modulation. The I channel modulation is removed by modulating the signal again by the I channel data to produce a signal containing only the Q channel data.

26 Claims, 9 Drawing Figures

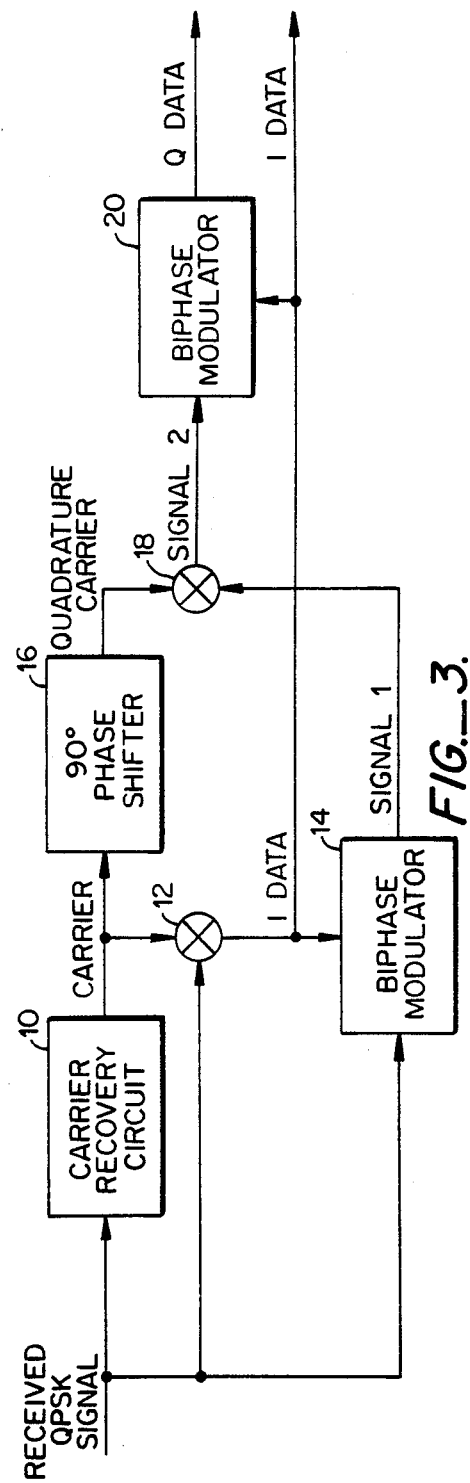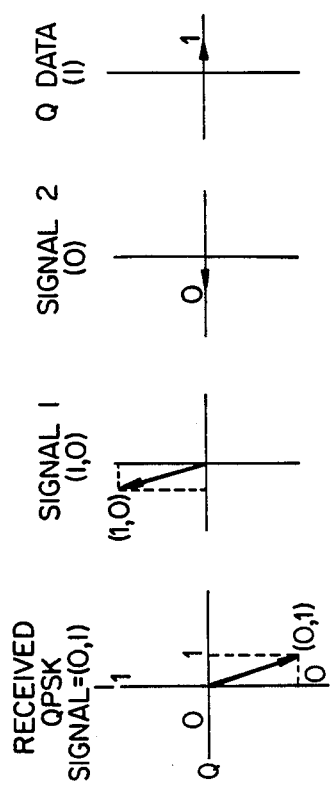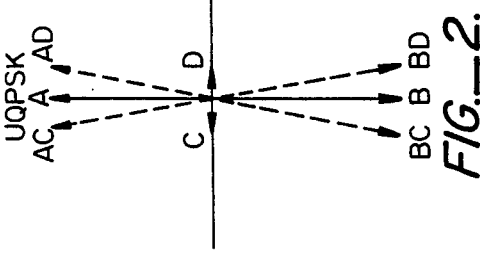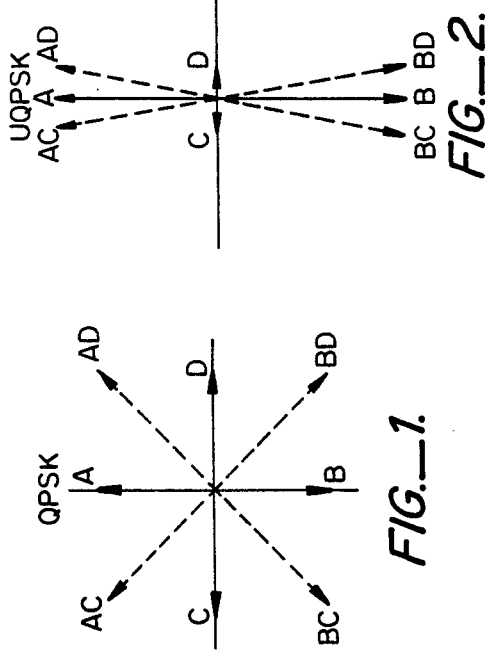

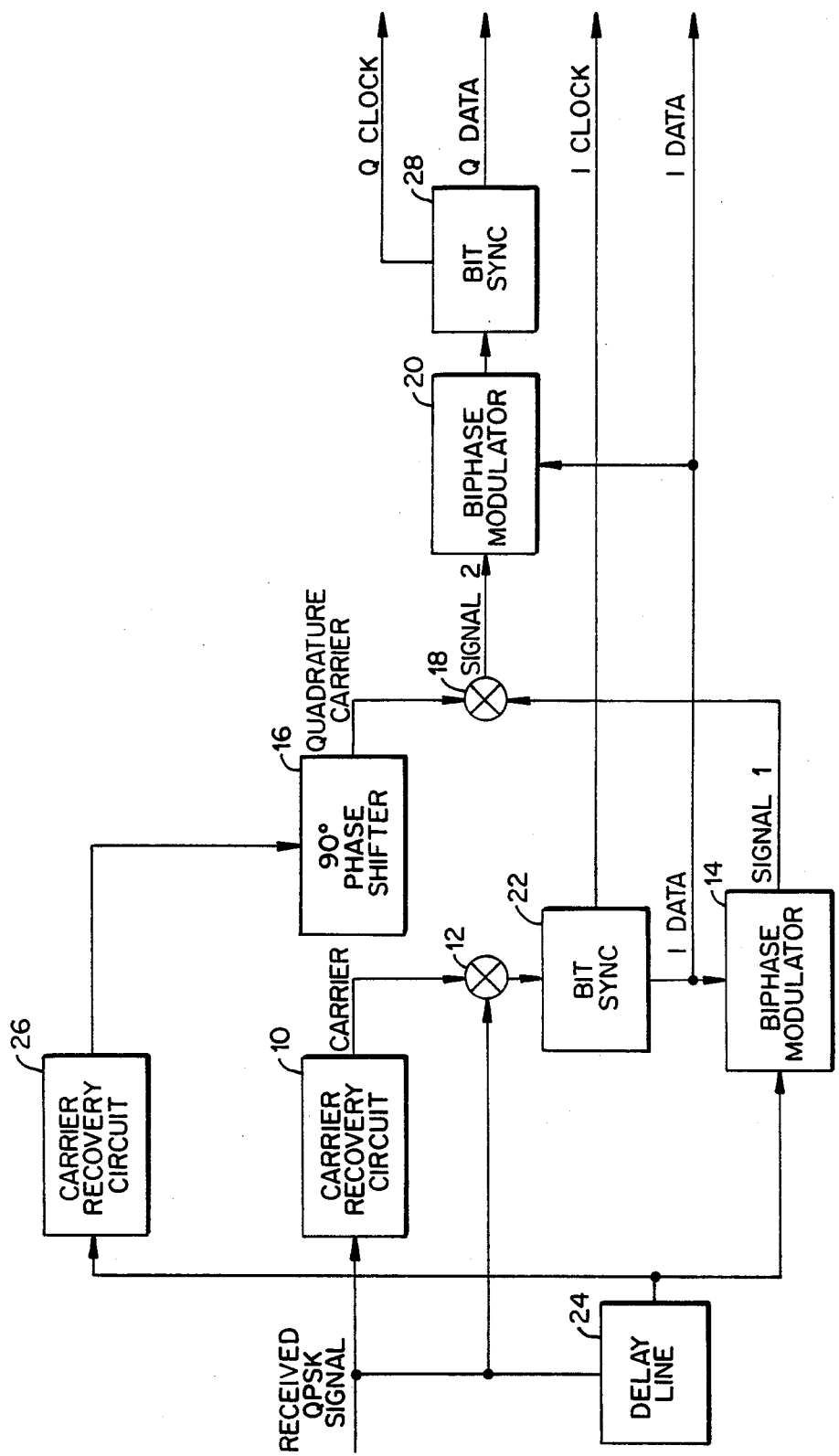
FIG._4.

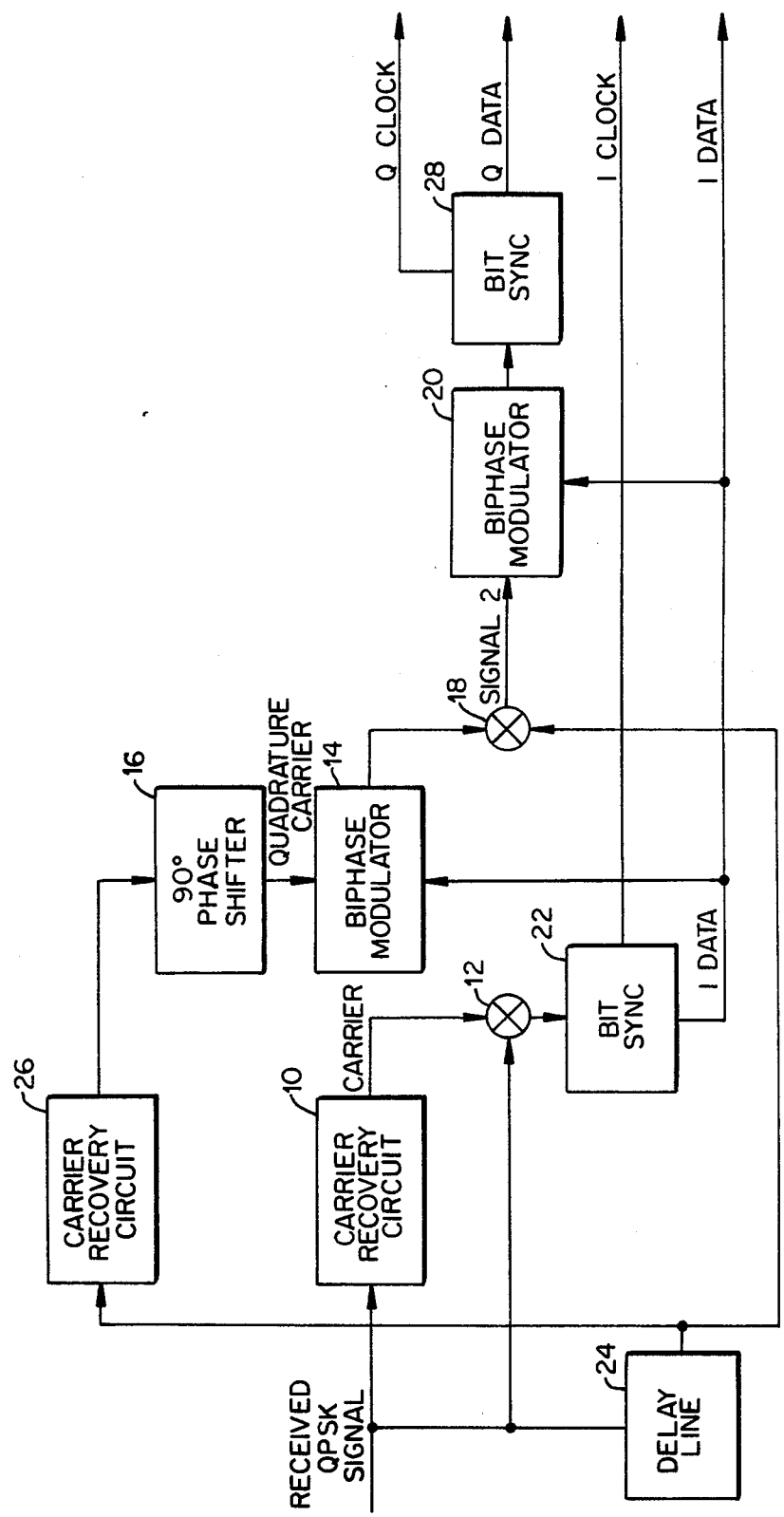
FIG._6.

CROSSTALK REDUCTION IN UNBALANCED QPSK DETECTORS

BACKGROUND OF THE INVENTION

This invention relates to the demodulation of signals modulated by quadrature phase shift keying (QPSK) modulation methods.

A QPSK signal is the superposition of two signals, a carrier frequency modulated by one set of data and referred to as the in-phase (I) channel signal, and the same carrier frequency in quadrature (phase shifted by 90°), and modulated by a second set of data and referred to as the quadrature (Q) channel signal. The QPSK signal is unbalanced if the two channels do not have equal power. QPSK signals are demodulated by first recovering the carrier frequency and then multiplying the QPSK signal by the carrier frequency which results in suppressing the quadrature phase channel and producing a signal containing only the I channel data which can then be demodulated. The Q channel data is recovered by first phase shifting the carrier so that it is in quadrature relationship to the carrier frequency thereby providing a quadrature carrier. The quadrature carrier is then multiplied by the QPSK signal which results in suppressing the signal containing the I channel data and producing a signal containing only the Q channel data.

This method works if the I and Q channels are in perfect quadrature relationship, that is, if they are exactly 90° ($\pi/2$ radians) apart. There must also be no phase error in the carriers used to recover the data. To the extent that the signals are not in perfect quadrature relationship or that there is phase error in the carrier used to detect the signals, undesired crosstalk between the I and the Q channels will result.

If the I and Q channels have the same magnitude, or more correctly power content, the effect of crosstalk on each channel will be approximately the same. If the power content of one channel is significantly larger than that of the other channel, the percentage effect of crosstalk of the higher power channel on the lower power channel will be significantly larger than the percentage effect of crosstalk of the lower power channel on the higher power channel. Thus the power supplied to each channel is preferably substantially equal in order to equally minimize errors in both channels.

Equal power distribution results in a waste of power where one channel otherwise requires less power than the other channel, such as when audio and video information are transmitted and the audio channel requires considerably less power than the video channel. Excess power requirements result in extra weight, size and heat dissipation equipment for the receiver. These requirements are especially critical in many applications, such as for receivers in spacecraft.

If the phase error introduced into the system could be controlled so that it was very small, the Q and I channels could use correspondingly different amounts of power and still use the above-described demodulation technique. However, maintaining very small phase errors is difficult and expensive, and becomes more difficult and expensive as the desired transmission fidelity increases. A description of known prior art demodulators follows.

U.S. Pat. No. 4,359,692 to Ryan discloses a shift keyed phase detector. The in-phase and quadrature channel signals are squared, and the squared signals are summed and filtered to provide a first phase error signal. The in-phase and quadrature channel signals are also multiplied with each other and filtered to provide a second phase error signal. The in-phase and quadrature channels are cross multiplied with each of the phase error signals and then combined to provide a data signal in phase with the original data signal. Thus, an error correction signal is used after detection of each channel to reduce oscillator error, as contrasted with crosstalk error.

U.S. Pat. No. 4,085,378 to Ryan et al. discloses a balanced QPSK demodulator which includes a modified Costas loop so configured as to cross couple the in-phase and quadrature phase channels such that minimum crosstalk takes place between the two channels. In effect, the two channels are independently demodulated. The Costas demodulation approach entails use of an error signal derived from the multiplication of the in-phase and quadra-phase channels to indicate the crosstalk between channels. The error signal resulting from the crosstalk is used to drive a reference VCO (voltage controlled oscillator). The demodulator is only suitable for balanced QPSK signals.

U.S. Pat. No. 4,092,606 to Ryan discloses a method of demodulation for a QPSK signal in which a phase lock loop having a variable frequency reference signal responsive to the QPSK signal drives the first and second channels. The demodulated signals are combined to derive a variable amplitude error signal for controlling the coherent reference frequency. Thus, VCO (voltage controlled oscillator) modulation (oscillator dither) is used to allow the signal to be processed in an advantageous manner.

SUMMARY OF THE INVENTION

The invention is a method and apparatus for demodulating unbalanced QPSK signals in a manner which reduces crosstalk between channels by employing phase information extracted from the higher powered signal to generate a precise demodulation signal in quadrature phase relationship with the higher powered signal. According to the invention, the I channel data is recovered by first recovering the carrier frequency and then multiplying the carrier frequency by the QPSK signal. The I channel is typically the higher powered channel and thus the crosstalk error in the recovered I channel data can be expected to be relatively small. The QPSK signal is then modulated with the recovered I channel data. The resulting signal is multiplied by a carrier in quadrature relationship to the recovered carrier to produce a second signal in which the crosstalk component has been eliminated and which contains the Q channel data with the I channel modulation. The I channel modulation is removed by modulating the signal again by the I channel data to produce a signal containing only the Q channel data.

In the preferred embodiment, the recovered I channel data is synchronized before being used to modulate the QPSK signal. Because the synchronization causes the I channel data signal to be delayed, the QPSK signal input into the modulator is also delayed by an amount equal to the delay of the synchronizer. To avoid phase errors in the quadrature carrier, the quadrature carrier used to multiply the resulting modulated signal is produced from the QPSK signal after it has been delayed rather than separately delaying the already recovered carrier, and thus a separate carrier recovery loop is used.

BRIEF DESCRIPTION OF THE DRAWINGS

FIG. 1 is a vector diagram of a balanced QPSK signal for illustrating power levels.

FIG. 2 is a vector diagram of an unbalanced QPSK signal for illustrating power levels.

FIG. 3 is a block diagram of a first embodiment of the invention.

FIG. 4 is a block diagram of a second embodiment of the invention.

FIGS. 5A–D are vector diagrams of a specific data signal at different points in the block diagram.

FIG. 6 is a block diagram of a third embodiment of the invention.

DETAILED DESCRIPTION OF THE PREFERRED EMBODIMENT

FIG. 1 shows a vector diagram of a QPSK signal. Channel 1 is a biphase shift keyed signal (BPSK) represented by vectors A and B, and channel 2 is another BPSK signal represented by vectors C and D. It can be seen that vectors C and D are in quadrature (separated by $\pi/2$ radians) with vectors A and B. The combination of these vectors can yield four different vector states, AC, AD, BD and BC. These four vector states can represent four digital numbers, i.e., 00, 01, 10 and 11. As can be seen, any error in any of the four vectors would result in approximately equal errors in each channel. For instance, a phase error in vector AD would result in a corresponding error in a vector A and vector D.

FIG. 2 shows an unbalanced QPSK signal wherein vectors C and D are substantially smaller in magnitude than vectors A and B, representing much less power in channel 2 than in channel 1. As can be seen, a phase error in vector AD would have a substantial effect on vector D and a minimal effect on vector A. Thus the I channel represented by vectors A and B can tolerate a larger crosstalk error, while the Q channel, represented by vectors C and D, can tolerate only a small phase error. These different tolerances are used to advantage in the present invention.

As shown in a first embodiment of the present invention in FIG. 3, which is useful for explaining the inventive principles of the invention, the received QPSK signal is processed through a carrier recovery circuit 10 to recover the carrier. The recovered carrier is then multiplied by the QPSK signal in a mixer 12 to produce the I channel data signal. This is the standard demodulation technique for QPSK signals used today.

Then, however, the I channel data signal is used to modulate the QPSK signal in a biphase modulator 14, producing a signal 1. A carrier in quadrature to the recovered carrier is derived by processing the recovered carrier through a 90° phase shifter 16. The quadrature carrier is then multiplied by signal 1 in a mixer 18 to produce a signal 2 which does not have the crosstalk component of the original QPSK signal and which contains only the Q channel data signal as modulated by the I channel data signal. Signal 2 is then processed through a biphase modulator 20 where it is modulated by the I channel data signal to remove the I channel modulation component and give an output signal which has only Q channel data.

The operation of mixer 12 in producing the I channel data signal is demonstrated by the following equation.

$$f(t) = A \cos(wt + n\pi) + B \sin(wt + m\pi) \qquad \text{Eq. 1}$$

where
w = angular frequency of the carrier;
A = Q channel amplitude;
B = I channel amplitude; and
n and m are time dependent modulation coefficients with values of 0 or 1.

Assume the carrier used to detect the I channel is $\sin(wt + \epsilon)$, where $\epsilon$ is the phase error. Simplifying, $\sin(wt + \epsilon) = \sin wt \cos \epsilon + \cos wt \sin \epsilon$. Mixer 12 multiplies the QPSK signal and the carrier giving the following result:

$$f(t) = [A \cos(wt + n\pi) + B \sin(wt + m\pi)] \qquad \text{Eq. 2}$$
$$[\sin wt \cos \epsilon + \cos wt \sin \epsilon]$$

Rearranging yields:

$$f(t) = A \cos(wt + n\pi) \cos wt \sin \epsilon + \qquad \text{Eq. 3}$$
$$B \sin(wt + m\pi) \sin wt \cos \epsilon + A \cos(wt + n\pi) \sin wt \cos \epsilon +$$
$$B \sin(wt + m\pi) \cos wt \sin \epsilon$$

Evaluating each term yields the following:

(1)
$$A \cos(wt + n\pi) \cos wt \sin \epsilon = \frac{A \sin \epsilon}{2} [\cos n\pi + \cos(2wt + n\pi)]$$

(2)
$$B \sin(wt + n\pi) \sin wt \cos \epsilon = \frac{A \cos \epsilon}{2} [\cos m\pi - \cos(2wt + m\pi)]$$

(3)
$$A \cos(wt + n\pi) \sin wt \cos \epsilon = \frac{A \cos \epsilon}{2} [-\sin n\pi + \sin(2wt + n\pi)]$$

(4)
$$B \sin(wt + m\pi) \cos wt \sin \epsilon = \frac{A \sin \epsilon}{2} [\sin m\pi + \sin(2wt + n\pi)]$$

Since n and m are always equal to 1 or 0, the terms sin $n\pi$ and sin $m\pi$ are zero. The remaining terms are harmonics of the carrier and can be filtered by mixer 12. Terms (3) and (4) therefore can be ignored. In terms (1) and (2), there are both modulation and carrier harmonic components. Filtering the harmonics leaves only the modulation $f(t)_m$. The value $f(t)_m$ is equal to (A/2) sin $\epsilon(\cos n\pi) + (B/2) \cos \epsilon(\cos m\pi)$ which is the desired information, (B/2) cos $\epsilon(\cos m\pi)$, and the crosstalk term, (A/2) sin $\epsilon(\cos n\pi)$. The ratio of crosstalk to signal is:

$$\frac{A/2 \sin \epsilon}{B/2 \cos \epsilon} = \frac{A}{B} \tan \epsilon.$$

If the Q channel data were being recovered by this method, the ratio of crosstalk to signal would be A/B tan $\epsilon$. For a 20 dB signal to crosstalk ratio, a maximum phase error of 0.57 degrees can be tolerated.

Instead of recovering the Q channel data by such method, the present invention modulates the QPSK signal with the I channel data signal in biphase modulator 14. The operation of biphase modulator 14 is shown by the following equations. (For purposes of the following equations, the I channel data signal is represented by A cos(wt + n$\pi$). This term can be recovered in a manner similar to that shown in the previous equations where the I channel was represented by B sin(wt+mπ).) The Q channel in the following equation is represented by B sin(wt+mπ), so that the QPSK signal, f(t) is as follows:

$$f(t) = A\cos(wt + n\pi) + B\sin(wt + m\pi). \quad \text{Eq. 4}$$

Modulator 14 effectively multiplies the signal by cos nπ yielding:

$$f(t) = [A\cos(wt + n\pi) + B\sin(wt + m\pi)]\cos n\pi \quad \text{Eq. 5}$$

Rearranging yields:

$$f(t) = \tfrac{1}{2}[A\cos(wt) + A\cos(wt + 2n\pi)] + B\cos n\pi \sin(wt + m\pi) \quad \text{Eq. 6}$$

Since n=1 or 0, Eq. 6 can be rewritten as follows:

$$f(t) = A\cos wt + B\cos n\pi \sin(wt + m\pi) \quad \text{Eq. 7}$$

Note that the I channel modulation is removed from the I channel and the Q channel is multiplied by the I channel modulation.

The resulting signal is multiplied by the quadrature carrier, sin(wt+ε), in mixer 18 to yield $f(t)_m$:

$$f(t)_m = [A\cos wt + B\cos n\pi \sin(wt + m\pi)] \quad \text{Eq. 8}$$

$$[\sin wt \cos \epsilon + \cos wt \sin \epsilon]$$

$$= A\cos wt \sin wt \cos \epsilon + A\cos wt \cos wt \sin \epsilon +$$

$$B\cos n\pi \sin(wt + m\pi)\sin wt +$$

$$B\cos n\pi \sin(wt + m\pi)\cos wt \sin \epsilon$$

Evaluating each term yields:

$$A\cos wt \sin wt \cos \epsilon = \frac{A\cos \epsilon}{2}[\sin 2wt] \quad (1)$$

$$A\cos wt \cos wt \sin \epsilon = \frac{A\sin \epsilon}{2}[1 + \cos 2wt] \quad (2)$$

$$B\cos n\pi \sin wt \cos \epsilon \sin(wt + m\pi) = \quad (3)$$

$$\frac{B\cos n\pi \cos \epsilon}{2}[\cos m\pi - \cos(2wt + m\pi)]$$

$$B\cos n\pi \sin(wt + m\pi)\cos wt \sin \epsilon = \quad (4)$$

$$\frac{B\cos n\pi \sin \epsilon}{2}[\sin(2wt + m\pi) + \sin(m\pi)]$$

Terms (1), (2), and (4) all contain only D.C., harmonic, or null terms. Only term (3) has any modulation products, thereby eliminating the crosstalk term (A/B) tan ε. The only remaining task is to remove the I channel modulation with biphase modulator 20. Discarding the harmonic portion of term (3) which is filtered out in mixer 18 yields:

$$f(t)_m = \frac{B\cos \epsilon \cos m\pi}{2} \cos n\pi \quad \text{Eq. 9}$$

Modulator 20 multiplies the above term by cos nπ therefore yielding:

$$f(t)_m = \frac{B\cos \epsilon \cos m\pi}{2} \cos 2n\pi \quad \text{Eq. 10}$$

$$= \frac{B\cos \epsilon \cos m\pi}{2}[\tfrac{1}{2}(1 + \cos 2n\pi)]$$

Since n=1 or 0, cos 2nπ=1 and Equation 10 can be written as follows:

$$f(t)_m = \tfrac{1}{2}B\cos \epsilon \cos m\pi. \quad \text{Eq. 11}$$

Although equation 11 shows that the Q data signal contains a phase error component cos ε due to the phase error of the quadrature carrier signal, the larger crosstalk phase error which was multiplied by the larger constant A has been eliminated.

It can be seen that the disclosed method of crosstalk reduction is sensitive to the fidelity of the modulating processes, the timing used, and the quality of the recovered I channel waveform. However, the method is not sensitive to the I/Q channel ratio and is thus capable of providing lower crosstalk than standard detectors.

The operation of the circuit of FIG. 3 can also be represented by the truth tables of Table 1 representing discrete states.

TABLE 1

| Received QPSK Signal I/Q | Signal 1 I/Q | Signal 2 Q | Q Data Q |
|---|---|---|---|
| 0/0 | 1/1 | 1 | 0 |
| 0/1 → | 1/0 → | 0 → | 1 |
| 1/0 | 1/0 | 0 | 0 |
| 1/1 | 1/1 | 1 | 1 |
| ↓ |  |  |  |
| I Data |  |  |  |
| I |  |  |  |
| 0 |  |  |  |
| 0 |  |  |  |
| 1 |  |  |  |
| 1 |  |  |  |

Four possible states of the received signal are shown as binary number pairs in the received QPSK signal columns. The recovered I data is shown in the I data column. The effect of modulating the QPSK signal with the I data in biphase modulator 14 is to invert any digital word with an I channel value of zero. Thus, the value 0,0 becomes 1,1 and the value 0,1 becomes 1,0 while the remaining two values are unchanged as shown in the columns under signal 1. Multiplying signal 1 by the quadrature carrier in mixer 18 has the effect of removing the I channel data from signal 2 as shown in the column under signal 2 in Table 1. Modulating signal 2 with the I channel data in biphase modulator 20 has the effect of inverting the first two words which were originally inverted to return them to their original states and result in the Q data.

The process illustrated by Table 1 can be further understood with a specific digital word as shown in FIGS. 5A–D. The digital word is the word 0,1 where the I channel has a value of zero and the Q channel has a value of one. FIG. 5A shows the received QPSK signal vector. FIG. 5B shows that the signal is inverted, or rotated by 180°, to produce a vector 1,0 as shown in FIG. 5B as a result of the modulation performed by biphase modulator 14. FIG. 5C shows the output signal 2 of mixer 18 in which the I channel data has been removed leaving only the Q channel value zero. This value is inverted by biphase modulator 20 to yield Q data value 1 as shown by FIG. 5D.

FIG. 4 shows a second embodiment of the invention. The invention is best implemented with the I channel data signal having first passed through a bit synchronizer 22. Bit synchronizer 22 filters the I channel data signal and uses a phase lock loop to recover the I channel clock. The invention shown in FIG. 4 contains the carrier recovery circuit 10, mixer 12, biphase modulator 14, 90° phase shifter 16, mixer 18, and biphase modulator 20 of the circuit of FIG. 3. Because bit synchronizer 22 causes a delay equivalent to the representation of one bit value in the I channel data signal applied to biphase modulator 14, the received QPSK signal is also delayed by a delay line 24 so that the QPSK channel is operated upon by the current I data signal rather than by a delayed I data signal.

Because the delay line may insert phase shift errors with respect to the carrier, a separate carrier recovery circuit 26 which operates upon the QPSK signal as delayed by delay line 24 is used. The quadrature carrier is then generated by 90° phase shifter 16.

The output of biphase modulator 20 is processed through a bit synchronizer 28 to produce a synchronized Q data signal and a Q data clock. Bit synchronizer 22 produces an I data clock in addition to the I data signal.

In an alternate configuration, biphase modulator 14 could be placed in the quadrature carrier signal path without affecting the output as shown in FIG. 6. The I channel data signal is recovered through carrier recovery circuit 10, mixer 12 and bit synchronizer 22 as in the circuit of FIG. 4. The QPSK signal is also processed through delay line 24, carrier recovery circuit 26 and 90° phase shifter 16 to produce the quadrature carrier. The quadrature carrier is then modulated by the I channel data signal in biphase modulator 14. The output of biphase modulator 14 is then mixed with the delayed QPSK signal output of delay line 24 in mixer 18 to produce a signal 2 which should be substantially identical to the signal 2 of the circuit of FIG. 4. Signal 2 is then modulated with the I channel data signal in biphase modulator 20 to produce the Q channel data signal. The Q channel data signal is processed through bit synchronizer 28 to produce the Q channel clock and a synchronized Q channel data signal.

While there has been described and illustrated one specific embodiment of the invention, it will be clear that variations in details of the embodiment specifically illustrated and described may be made without departing from the true spirit and scope of the invention as defined in the appended claims.

What is claimed is:

1. A method of demodulating a received quadrature phase shift keyed signal, which includes a carrier frequency, in phase data, a quadrature carrier frequency and quadrature data, comprising:
    recovering the carrier frequency from the received signal;
    recovering the in phase data by multiplying the received signal by the carrier frequency;
    modulating the received signal with the recovered in phase data to produce a first signal;
    producing the quadrature carrier which is in quadrature to the carrier frequency;
    multiplying the first signal by the quadrature carrier to produce a second signal; and
    modulating the second signal with the received in phase data to produce the quadrature phase data.

2. A method as recited in claim 1 further comprising: synchronizing the in phase data before modulating the received signal and before modulating the second signal.

3. A method as recited in claim 2 further comprising: delaying the received signal before modulating it by the in phase data by an amount of time equal to the delay of the in phase data caused by synchronization.

4. A method as recited in claim 3 wherein the quadrature carrier is produced from the delayed received signal.

5. A method as recited in claim 1 further comprising: synchronizing the quadrature phase data.

6. A method as recited in claim 1 further including the step of filtering out the harmonics of the carrier frequency.

7. A method of demodulating a received quadrature phase shift keyed signal, which includes a carrier frequency, in phase data, a quadrature carrier frequency and quadrature data, comprising:
    recovering the carrier frequency from the received signal;
    recovering the in phase data by multiplying the received signal by the carrier frequency;
    synchronizing the in phase data;
    delaying the received signal;
    modulating the delayed received signal with the synchronized in phase data to produce a first signal;
    producing the quadrature carrier from the delayed received signal which is in quadrature to the carrier frequency;
    multiplying the first signal by the quadrature carrier to produce a second signal; and
    modulating the second signal with the synchronized in phase data to produce the quadrature phase data.

8. A method of demodulating a received quadrature phase shift keyed signal, which includes a carrier frequency, in phase data, a quadrature carrier frequency and quadrature data, comprising:
    recovering the carrier frequency from the received signal;
    recovering the in phase data by multiplying the received signal by the carrier frequency;
    producing the quadrature carrier from a representation of the received signal, such that the quadrature carrier is in quadrature phase relationship to the carrier frequency;
    modulating the quadrature carrier with the recovered in phase data to produce a first signal;
    multiplying the first signal by the representation of the received signal to produce a second signal; and
    modulating the second signal with the received in phase data.

9. A method as recited in claim 8 further comprising: synchronizing the in phase data before modulating the quadrature carrier and before modulating the second signal.

10. A method as recited in claim 9 further comprising: delaying the representation of the received signal to produce the quadrature carrier by an amount of time equal to the delay of the in phase data caused by synchronization.

11. A method as recited in claim 8 further comprising: synchronizing the quadrature phase data.

12. A method as recited in claim 8 further including the step of filtering out the harmonics of the carrier frequency.

13. A method of demodulating a received quadrature phase shift keyed signal, which includes a carrier frequency, in phase data, a quadrature carrier frequency and quadrature data, comprising:
- recovering the carrier frequency from the received signal;
- recovering the in phase data by multiplying the received signal by the carrier frequency;
- synchronizing the in phase data;
- delaying the received signal;
- producing the quadrature carrier which is in quadrature to the carrier frequency from the delayed received signal;
- modulating the quadrature carrier with the synchronized in phase data to produce a first signal;
- multiplying the first signal by the delayed signal to produce a second signal; and
- modulating the second signal with the synchronized in phase data.

14. An apparatus for demodulating a received quadrature phase shift keyed signal, which includes a carrier frequency, in phase data, a quadrature carrier frequency and quadrature data, comprising:
- means for recovering the carrier frequency from the received signal;
- means for recovering the in phase data by multiplying the received signal by the carrier frequency;
- means for modulating the received signal with the recovered in phase data to produce a first signal;
- means for producing the quadrature carrier which is in quadrature to the carrier frequency;
- means for multiplying the first signal by the quadrature carrier to produce a second signal; and
- means for modulating the second signal with the recovered in phase data to produce the quadrature phase data.

15. An apparatus as recited in claim 14 further comprising:
- means for synchronizing the in phase data before modulating the received signal and before modulating the second signal.

16. An apparatus as recited in claim 15 further comprising:
- means for delaying the received signal before modulating it by the in phase data by an amount of time equal to the delay of the in phase data caused by synchronization.

17. An apparatus as recited in claim 16 wherein the quadrature carrier is produced from the delayed received signal.

18. An apparatus as recited in claim 14 further comprising:
- means for synchronizing the quadrature phase data.

19. An apparatus as recited in claim 14 further including means for filtering out the harmonics of the carrier frequency.

20. An apparatus for demodulating a received quadrature phase shift keyed signal, which includes a carrier frequency, in phase data, a quadrature carrier frequency and quadrature data, comprising:
- means for recovering the carrier frequency from the received signal;
- means for recovering the in phase data by multiplying the received signal by the carrier frequency;
- means for synchronizing the in phase data;
- means for delaying the received signal;
- means for modulating the delayed received signal with the synchronized in phase data to produce a first signal;
- means for producing the quadrature carrier which is in quadrature to the carrier frequency from the delayed received signal;
- means for multiplying the first signal by the quadrature carrier to produce a second signal; and
- means for modulating the second signal with the synchronized in phase data to produce the quadrature phase data.

21. An apparatus for demodulating a received quadrature phase shift keyed signal, which includes a carrier frequency, in phase data, a quadrature carrier frequency and quadrature data, comprising:
- means for recovering the carrier frequency from the received signal;
- means for recovering the in phase data by multiplying the received signal by the carrier frequency;
- means for producing the quadrature carrier from a representation of the received signal such that the quadrature carrier is in quadrature to the carrier frequency;
- means for modulating the quadrature carrier with the recovered in phase data to produce a first signal;
- means for multiplying the first signal by the representation of the received signal to produce a second signal; and
- means for modulating the second signal with the recovered in phase data to produce the quadrature phase data.

22. An apparatus as recited in claim 21 further comprising:
- means for synchronizing the in phase data before modulating the quadrature carrier and before modulating the second signal.

23. An apparatus as recited in claim 22 further comprising:
- means for delaying the representation of the received signal to produce the quadrature carrier by an amount of time equal to the delay of the in phase data caused by synchronization.

24. An apparatus as recited in claim 21 further comprising:
- means for synchronizing the quadrature phase data.

25. An apparatus as recited in claim 21 further including means for filtering out the harmonics of the carrier frequency.

26. An apparatus for demodulating a received quadrature phase shift keyed signal, which includes a carrier frequency, in phase data, a quadrature carrier frequency and quadrature data, comprising:
- means for recovering the carrier frequency from the received signal;
- means for recovering the in phase data by multiplying the received signal by the carrier frequency;
- means for synchronizing the in phase data;
- means for delaying the received signal;
- means for producing the quadrature carrier from the delayed received signal which is in quadrature to the carrier frequency;
- means for modulating the quadrature carrier with the synchronized in phase data to produce a first signal;
- means for multiplying the first signal by the delayed received signal to produce a second signal; and
- means for modulating the second signal with the synchronized in phase data to produce the quadrature phase data.

* * * * *